US012691477B2

(12) United States Patent
Moe

(10) Patent No.: US 12,691,477 B2
(45) Date of Patent: Jul. 28, 2026

(54) SYSTEMS, METHODS, AND DEVICES FOR CLEANING A HOSE OR PIPE

(71) Applicant: Stephan Moe, Agoura Hills, CA (US)

(72) Inventor: Stephan Moe, Agoura Hills, CA (US)

(73) Assignee: Stephan Moe, Agoura Hills, CA (US)

( * ) Notice: Subject to any disclaimer, the term of this patent is extended or adjusted under 35 U.S.C. 154(b) by 387 days.

(21) Appl. No.: 18/333,814

(22) Filed: Jun. 13, 2023

(65) Prior Publication Data

US 2023/0398583 A1 Dec. 14, 2023

Related U.S. Application Data

(60) Provisional application No. 63/351,658, filed on Jun. 13, 2022.

(51) Int. Cl.
*B08B 9/032* (2006.01)

(52) U.S. Cl.
CPC .................................. *B08B 9/0321* (2013.01)

(58) Field of Classification Search
CPC ........ B08B 9/0321; B08B 9/027; B08B 9/032
See application file for complete search history.

(56) References Cited

U.S. PATENT DOCUMENTS 4,030,513 A * 6/1977 McKenzie ................ B05B 3/06 134/179
4,182,497 A * 1/1980 Ferreira .............. E04D 13/0765 239/587.5
4,600,153 A * 7/1986 Stone ...................... F28G 1/166 239/560
5,211,335 A * 5/1993 Strid ..................... B05B 15/534 239/110
5,573,187 A * 11/1996 Proctor ................... B08B 9/093 134/167 C
6,206,980 B1 * 3/2001 Robinson ............ A47L 11/4088 15/322
7,963,462 B1 * 6/2011 Ramos, Sr. ............ B05B 3/063 239/233
8,337,636 B1 * 12/2012 Vance ..................... B08B 3/026 134/166 R
2004/0200514 A1 * 10/2004 Lee ......................... E03C 1/304 134/169 C
2019/0224724 A1 * 7/2019 Gromes, Sr. .......... B05B 1/1636

FOREIGN PATENT DOCUMENTS

EP 3659546 A1 * 6/2020 ......... A61C 13/0019
WO WO-2012052519 A2 * 4/2012 ............ A61M 1/982

* cited by examiner

*Primary Examiner* — Benjamin L Osterhout
(74) *Attorney, Agent, or Firm* — Ferguson Case Orr Paterson LLP

(57) ABSTRACT

Embodiments incorporating features of the present disclosure include systems and devices directed to cleaning air gap hoses and include a pressurizing device, a spray head with holes to allow fluid to flow through the spray head, a hose configured to connect the pressurizing tank and the spray head, and a removal clip device. These systems allow for easy and quick cleaning of air gap hoses using pressurized fluid.

10 Claims, 4 Drawing Sheets

SYSTEMS, METHODS, AND DEVICES FOR CLEANING A HOSE OR PIPE

RELATED APPLICATION

This application claims the priority benefit of U.S. Provisional Patent Application No. 63/351,658, filed on Jun. 13, 2022. This application is incorporated by reference as if set forth fully herein.

BACKGROUND

Field of the Disclosure

The present disclosure relates to cleaning, and, more particularly, to systems, methods, and devices directed to cleaning a dishwasher or garbage disposal hose or pipe connected to an air gap.

Description of the Related Art

A dishwasher air gap refers to a fixture that provides back-flow prevention for an installed dishwasher. This air gap is typically seen above the kitchen sink as a small cylindrical fixture mounted parallel with the faucet. This fixture is typically covered by a cover or cap with a cut-out for the air gap. Below the sink, the drain hose from the dishwasher feeds the top of the air gap, and the bottom of the air gap is plumbed into the sink drain below the basket of the sink, or into a garbage disposal unit.

When installed and maintained properly, the air gap prevents drain water from the sink and/or garbage disposal from backing up into the dishwasher, possibly contaminating the dishes. Water flowing from the fixture into the sink indicates a need for maintenance or repair. The garbage disposal frequently kicks up food into the segment of the dishwasher drain line between the air gap and the garbage disposal, clogging the line and forcing water to flow out of the air gap as it is intended to do. In order to clear the drain line, a pipe brush may be used or one could remove the air gap, remove the hoses, clean the hoses, and reassemble the system. A pipe brush is often difficult to use and not effective and taking the system apart, cleaning it, and putting it back together is time consuming.

SUMMARY OF THE DISCLOSURE

One embodiment of a system for cleaning pipes or hoses according to the present disclosure comprises a pressurizing tank, a spray head device with holes that allow fluid to flow between the inside of the device and the outside, a hose that connects the spray head device and the pressurizing tank, and a removal clip configured to remove an air gap baffle and give access to the interior of an air gap.

One example of a spray head device according to the present disclosure comprises a hollow, cylindrical body and a multitude of holes throughout the body configured to allow fluid to flow between the interior and the exterior of the body.

These and other further features and advantages of the disclosure would be apparent to those skilled in the art from the following detailed description of the disclosure and accompanying drawings which set forth illustrative embodiments in which the principles of the disclosures are utilized.

Figure 1:
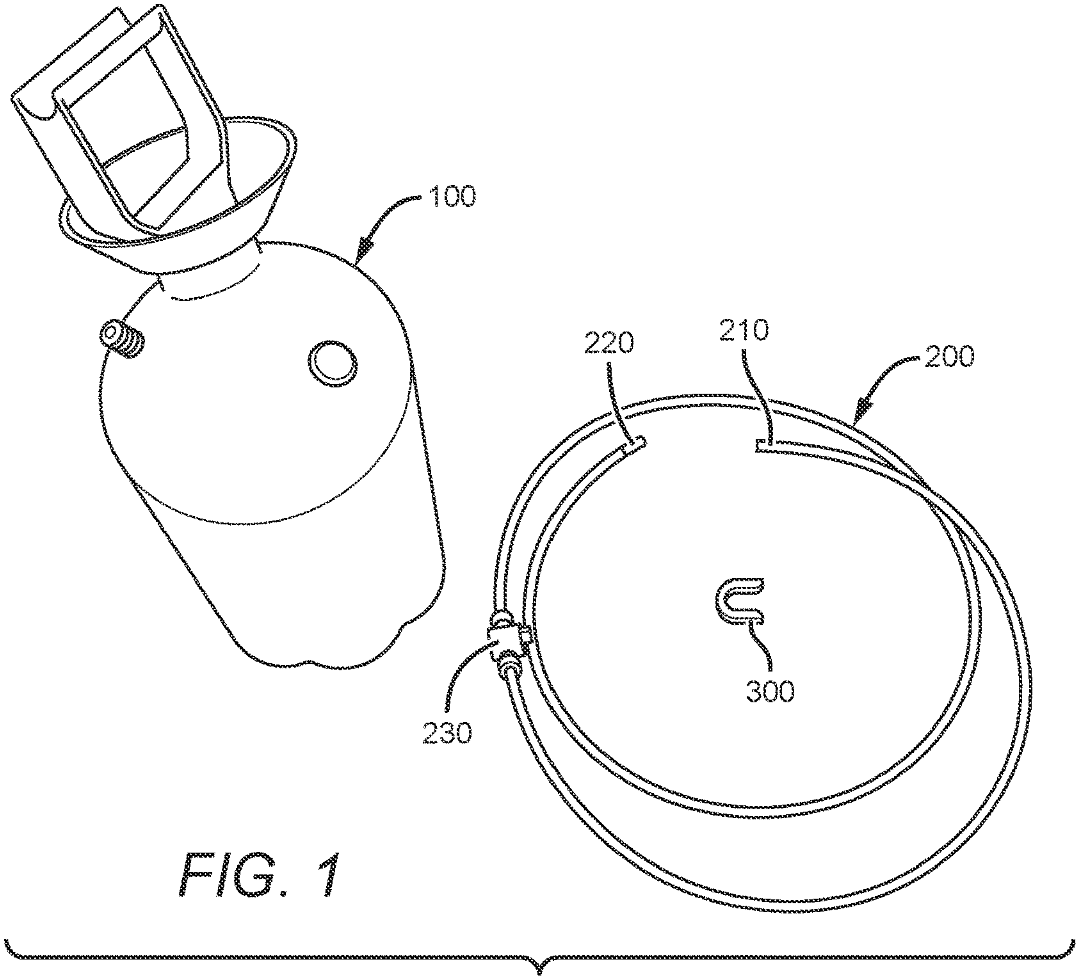
FIG. 1 shows a top perspective view of a cleaning system according to one embodiment of the present disclosure.

The drawings are for the purpose of illustrating various exemplary embodiments. It is understood that the disclosure is not limited to the arrangements and depictions shown in the drawings.

DETAILED DESCRIPTION OF THE DISCLOSURE

Embodiments incorporating features of the present disclosure include systems and devices directed to cleaning air gap hoses and include a pressurizing tank, a spray head with holes to allow fluid to flow through the spray head, a hose configured to connect the pressurizing tank and the spray head, and a removal clip device. These systems allow for easy and quick cleaning of air gap hoses using pressurized fluid.

Throughout this description, the embodiments and examples illustrated should be considered as exemplars, rather than as limitations on the present disclosure. As used herein, the term "disclosure," "device," "present disclosure," or "present device" refers to any one of the embodiments of the disclosure described herein, and any equivalents. Furthermore, reference to various feature(s) of the "disclosure," "device," "present disclosure," or "present device" throughout this document does not mean that all claimed embodiments or methods must include the referenced feature(s).

It is also understood that when an element or feature is referred to as being "on" or "adjacent" to another element or feature, it can be directly on or adjacent the other element or feature or intervening elements or features may also be present. It is also understood that when an element is referred to as being "attached," "connected" or "coupled" to another element, it can be directly attached, connected or coupled to the other element or intervening elements may be present. In contrast, when an element is referred to as being "directly attached," "directly connected" or "directly coupled" to another element, there are no intervening elements present.

Relative terms, such as "outer," "above," "lower," "below," "horizontal," "vertical" and similar terms, may be used herein to describe a relationship of one feature to another. It is understood that these terms are intended to encompass different orientations in addition to the orientation depicted in the figures.

Although the terms first, second, etc. may be used herein to describe various elements or components, these elements or components should not be limited by these terms. These terms are only used to distinguish one element or component from another element or component. Thus, a first element or component discussed below could be termed a second element or component without departing from the teachings of the present disclosure. As used herein, the term "and/or" includes any and all combinations of one or more of the associated list items.

The terminology used herein is for describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," when used herein, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to different views and illustrations that are schematic illustrations of idealized embodiments of the disclosure. As such, variations from the shapes of the illustrations as a result, for example, of manufacturing techniques and/or tolerances are expected. Embodiments of the disclosure should not be construed as limited to the particular shapes of the regions illustrated herein, but are to include deviations in shapes that result, for example, from manufacturing.

Figure 2:
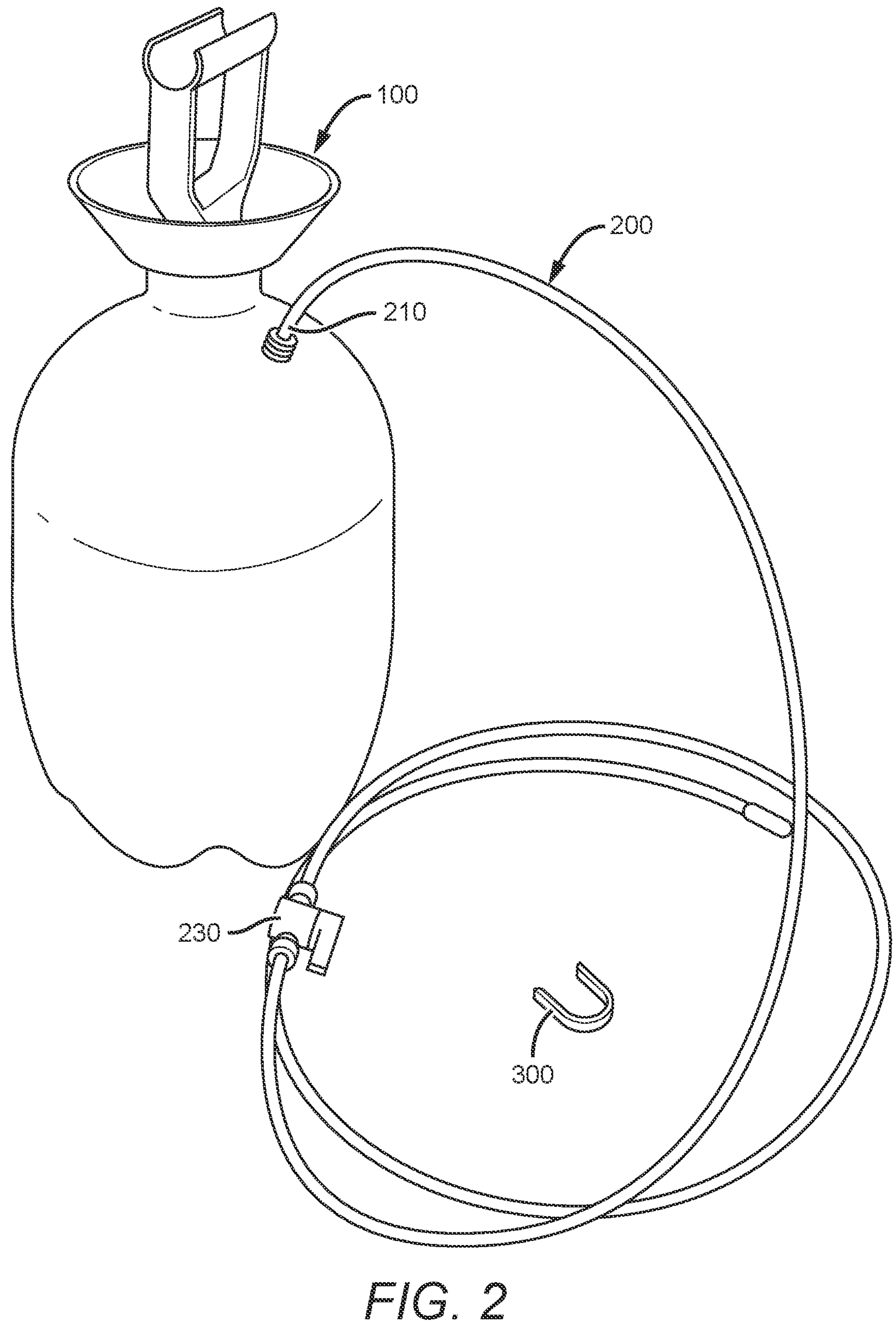
FIG. 2 is a top perspective view of the cleaning system according to the embodiment of the present disclosure as shown in FIG. 1.

As shown in FIG. 1, one embodiment of a system directed to cleaning air gap hoses comprises (1) a pressurizing tank 100; (2) a spray head device; (3) a hose 200 with, among other things, a first end 210 configured to connect to the pressurizing tank 100, a second end configured to connect to the spray head device, and (4) a removal clip 300. As shown in FIG. 2, the pressurizing tank 100 may have point of connection to allow the hose 200 at the first end 210 to securely attach. Moreover, the embodiment of the hose exemplified in FIGS. 1-3 further comprises a valve 230 that allows or stops flow through the hose.

Figure 4:
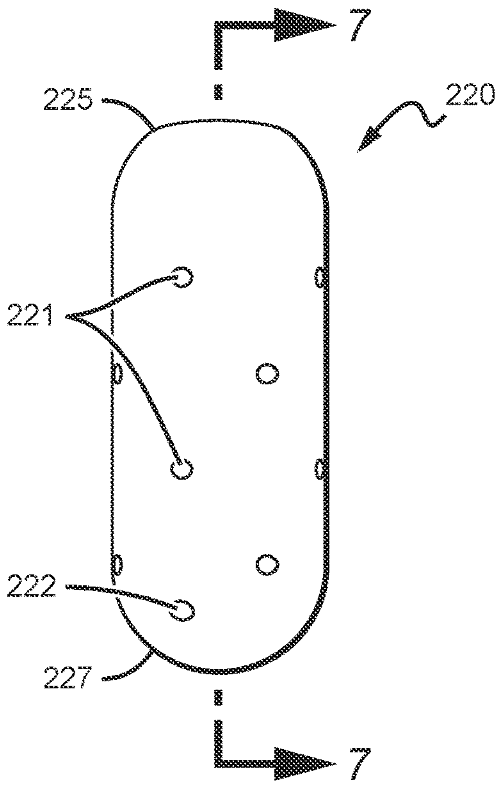
FIG. 4 is a front side elevation view of the spray head device according to one embodiment of the present disclosure.
Figure 5:
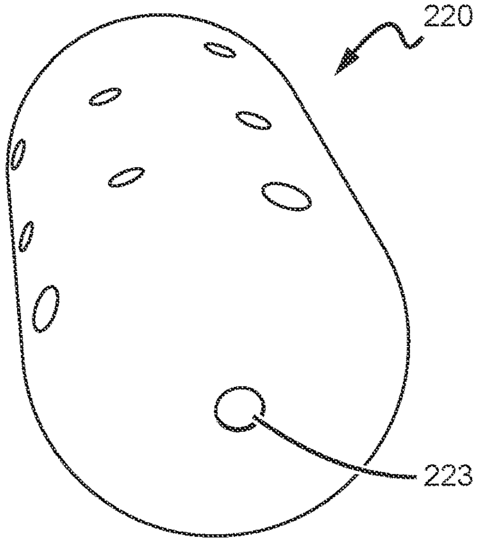
FIG. 5 is a bottom perspective view of the spray head device according to the embodiment of the present disclosure as shown in FIG. 4.
Figure 6:
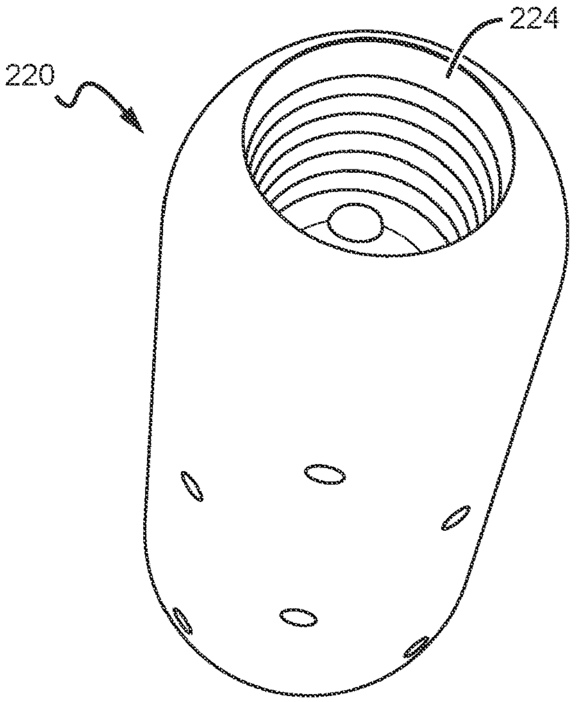
FIG. 6 is a top perspective view of the spray head device according to the embodiment of the present disclosure as shown in FIG. 4.
Figure 8:
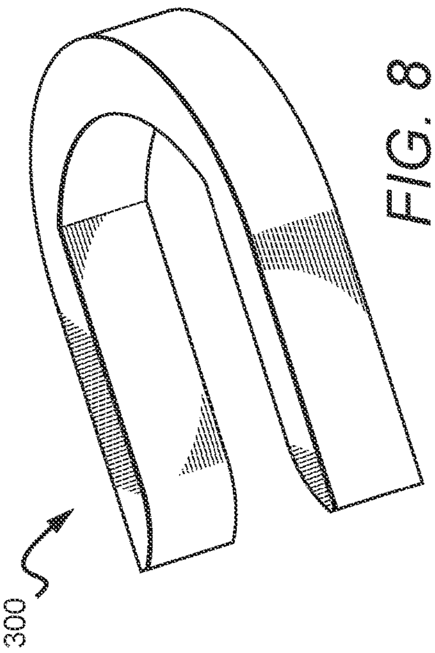
FIG. 8 is a right side perspective view of a removal device according to one embodiment of the present disclosure.
Figure 9:
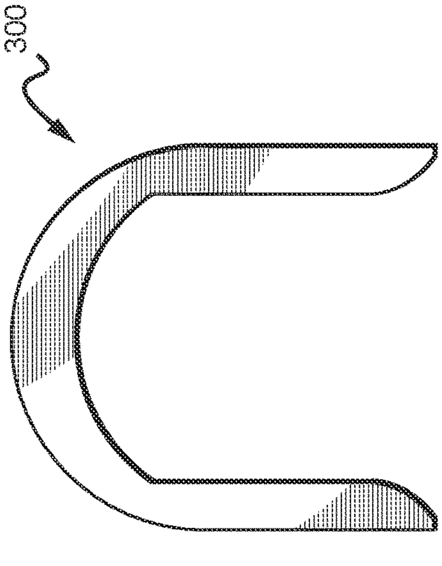
FIG. 9 is a top plan view of the removal device according to the embodiment of the present disclosure ash shown in FIG. 8.
Figure 7:
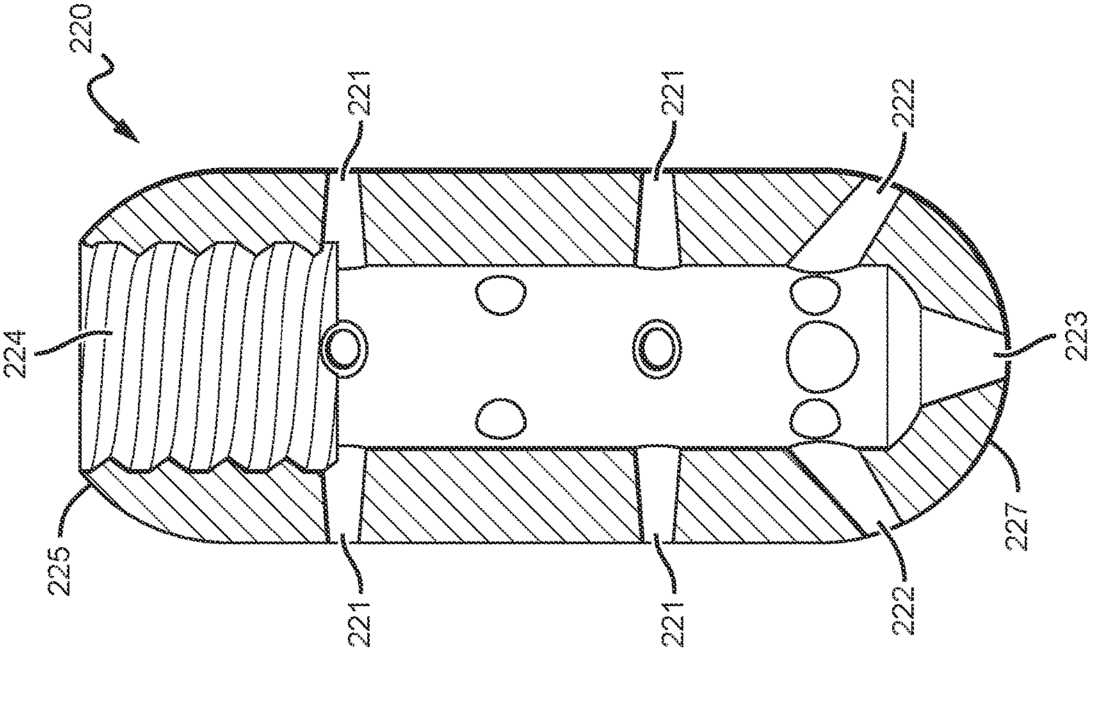
FIG. 7 is a sectional view using cutting plane 7 of the spray head device according to the embodiment of the present disclosure as shown in FIG. 4.

As shown in FIGS. 4-7, the spray head 220 is a cylindrical, hollow device with a top end 225 and a bottom end 227. In certain embodiments, at the top end 225, as shown in FIG. 5, has a hole that is configured with threads. These threads allow the spray head device to connect securely to the hose 200. At the bottom end 227 of the spray head 220 is another hole 223 that is configured to expel fluid such as air or water.

In the preferred embodiment of the spray head device 220, best shown in FIG. 4, there are holes 221, 222, 223 cut allowing fluid, such as air, vinegar, or water, to flow through the device and out through the holes 221, 222, 223. In the embodiment shown, all of the holes 221, 222, 223 are cut in a conical fashion, meaning the holes 221, 222, 223 are bigger from within and become gradually smaller as the hole moves towards the outside. This conical configuration of the holes 221, 222, 223 creates a jet like spray when a fluid is flowing through the spray head.

In the embodiment shown in FIGS. 4-7, in addition to the hole 223 at the bottom end 227 of the spray head device 220, there are 20 other holes 222, 223 situated throughout the body of the device 220. It is understood that there may be more or less holes situated throughout the body of the spray head device 220. It is also understood that different placements of and/or spacing between the holes are possible throughout the body of the spray head device 220.

There are four holes 222 near the bottom end 227 of the spray head device 220. These holes 222 are angled at approximately 22.5 degrees downward from the horizontal plane. It is understood that various angles may be used, such as 22°, 22.5°, 23°, 23.5°, 24°, 24.5°, 25°, 25.5°, 26°, 26.5°, 27°, 27.5°, 28°, 28.5°, 29°, 29.5°, 30°, and so on.

Additionally, in the embodiment shown in FIGS. 4-7, there are 16 holes 223 throughout the body of the spray head device 220. These holes 223 are parallel to the horizontal plane. It is understood that other embodiments may include holes that are angled rather than parallel and other embodiments of the spray head device may have differing angles for each or some of the holes. It is further understood that other embodiments may include less or more holes and that many combinations of holes and angles are possible.

Figure 3:
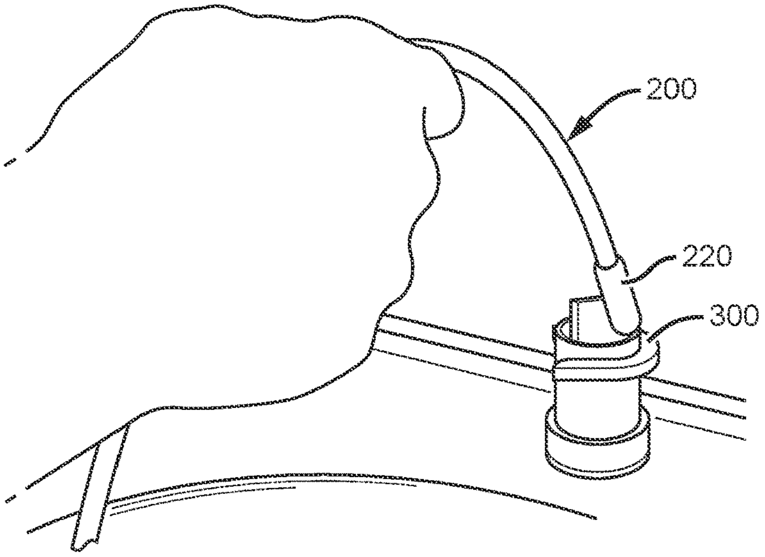
FIG. 3 is a view of a portion of the cleaning system in use according to the embodiment of the present disclosure as shown in FIG. 1.

In the particular embodiment shown in FIGS. 1-3, the spray head 220 is made from polylactic acid, but it is understood that the spray head 220 can comprise many other durable materials such as polyethylene terephthalate glycol-modified, nylon, or metal.

As mentioned above, the cleaning system also comprises a removal clip 300, shown in FIGS. 1, 3, 8, and 9. The removal clip 300 is configured in a U-shape to fit around and into two slots on the air gap and activate the mechanism on air gap that releases the air gap baffle, which is essentially a cover for the air gap, allowing a user to pull the baffle out of the air gap. Utilization of the removal clip 300 to remove the air gap baffle gives a user access to the pipes or hoses that need cleaning, as shown in FIG. 3. The removal clip 300 is only unclipped from the air gap once the cleaning has been performed and the user is ready to put the air gap baffle and cover back on. At that point, the user removes or unclips the removal clip 300, places the baffle back in the air gap, and puts the air gap cover back on.

The particular embodiment of the removal clip 300 shown in FIGS. 1, 3, 8, and 9 is made of polylactic acid, but it is understood that the removal clip 300 can comprise many other durable materials such as polyethylene terephthalate glycol-modified, nylon, or metal.

To operate the system and clean an air gap in the embodiment shown in FIGS. 1-3, the pressurizing tank 100 is filled with water, the first end 210 is connected to the pressurizing tank 100, the removal clip 300 is used to remove the air gap cover, and then the spray head device 220 is inserted into the air gap and moved up and down the hose of the air gap while the pressurizing tank 100 is utilized to flow water through the hose and, thus, the spray head device 220. The water coming from the spray head device 220 is used to dislodge any food particles and or other matter that may be clogging or dirtying the air gap hose line, such that the blockage material can flow towards the drain and/or disposal.

The pressurizing tank 100 shown in FIGS. 1-3 comprises a tank made of polyethylene with a pressure relief valve, configured to pressurize liquid using a hand pump. It is understood that other variations of a pressurizing tank may be used. In some embodiments, the first end 210 of the hose 200 is configured to connect to a sink faucet rather than a pressurizing tank 100. The sink faucet can then be used as a water source for the system rather than the water pressure tank 100.

Although the present disclosure has been described in detail with reference to certain configurations thereof, other versions are possible. Embodiments of the present disclosure can comprise any combination of compatible features shown in the various figures, and these embodiments should not be limited to those expressly illustrated and discussed. Therefore, the spirit and scope of the disclosure should not be limited to the versions described above.

The foregoing is intended to cover all modifications and alternative constructions falling within the spirit and scope of the disclosure as expressed in the claims, wherein no portion of the disclosure is intended, expressly or implicitly, to be dedicated to the public domain if not set forth in any claims.

I claim:

1. A spray head device, comprising:

a hollow body with a top end and a bottom end; and a plurality of holes conically shaped with a wider end that meets an interior of said body and narrower end that meets an exterior of said body spaced throughout said body and configured to allow fluid to flow between said interior and said exterior of said body through said holes.

2. The spray head device of claim 1, wherein said hollow body is cylindrical.

3. The spray head device of claim 1, wherein at least one of said plurality of holes is located at said top end and comprises a connection mechanism to allow said spray head device to connect to a hose.

4. The spray head device of claim 3, wherein said connection mechanism comprises threads within said hole located at said top end.

5. The spray head device of claim 1, wherein at least one of said plurality of holes is angled downward.

6. The spray head device of claim 5, wherein said downward angle is 22.5 degrees.

7. The spray head device of claim 1, wherein said spray head device is made of polylactic acid.

8. The spray head device of claim 1, wherein said spray head device is made of polyethylene terephthalate glycol-modified.

9. The spray head device of claim 1, wherein said spray head device is made of nylon.

10. The spray head device of claim 1, wherein said spray head device comprises at least 16 holes.

* * * * *